3,078,162
DYE BRIGHTENING AGENT IN DIAZOTYPE PROCESS

Edward C. Bialczak, Johnson City, and Walter J. Welch, Port Dickinson, N.Y., assignors to General Aniline & Film Corporation, New York, N.Y., a corporation of Delaware
No Drawing. Filed Aug. 12, 1960, Ser. No. 49,180
11 Claims. (Cl. 96—49)

The present invention pertains to an improvement of dye brightness in prints obtained from light-sensitive diazotype materials and, more particularly, to the accomplishment of this result by resort to aryl phosphonic acids, aryl phosphinic acids, aryl sulfinic acids or boro phosphoric acids, or the soluble salts of the same.

As is known, the diazotype process involves treating a base such as paper or the like, with a sensitizing composition containing a light-sensitive diazo compound, exposing the treated base through a pattern, and subjecting the exposed material to development by means of an alkali, in the presence of an azo dye coupling component capable of reacting with the undestroyed diazo compound to produce azo dyestuff images. This process, which is of rather general application, usually employs coupling components which yield prints which may be maroon, blue, black or sepia.

The brightness of the dye formed by this process is dependent upon the environment in which the dye is formed. Dye brightness can be enhanced by coating the sensitizing solution on a precoated base. Precoats such as casein and silica are effective in dye brightening. Brightness can also be enhanced by addition of suitable components to the sensitizing solution such as pigments, certain salts such as zinc chloride and certain organic acids or salts of the same. This invention relates to the addition of the latter.

It has been discovered that a substantial improvement in dye brightness may be obtained by precoating a base with a composition containing an aryl phosphinic acid, aryl phosphonic acid, boro phosphoric acid or an aryl sulfinic acid, or the soluble salts of the same or by adding the dye brightening agent to the sensitizing solution. An improvement in brightness is noted in formulations which produce blue, black, maroon or sepia dye prints.

The dye brightening agent, in addition to improving brightness, possesses other advantages. They include the following:

(1) Decreases gas fade of the dye. The term "gas fading" in the diazotype industry relates generally to the adverse effect of atmospheric gases upon the dye image. For example, certain blue dyes upon exposure to atmosphere will vary anywhere from a blue, brown or black image. The presence of, i.e., phenyl-phosphinic acid hinders markedly this transformation.

(2) Causes a hypsochromatic shift. Many of the blue dyes used in this art are of a very purplish hue, for example, the dye formed by 2,3-dihydroxy-naphthalene-6-sulfonic acid and p-N,N-diethylamino benzene diazonium chloride. In the presence of, i.e., phenyl-phosphinic acid, a hypsochromatic shift results, with the dye losing its red character.

(3) Improves package life of the sensitized material. Generally, aged diazotype material does not give as bright a shade as freshly coated material. The addition of, i.e., phenyl phosphinic acid to a diazo formulation causes it to retain its original brightness.

The utilization of the aforesaid dye brightening agents in a precoat or sizing composition or in a diazotype sensitizing composition constitutes the purposes and objects of our invention.

The dye brightening agents contemplated for use herein are aryl phosphonic acids such as phenyl-phosphonic acid, naphthyl-phosphonic acid and their ammonium, potassium, sodium and anilino salts; aryl phosphinic acids such as phenyl-phosphinic acid, diphenyl-phosphinic acid, [α-hydroxyethyl] phenyl-phosphinic acid, 4-chlor-phenyl-phosphinic acid (1), 4-brom-phenyl-phosphinic acid (1), 1-ethyl-phenyl-phosphinic acid (4), 1-methyl-phenyl-phosphinic acid (2), 1-methyl-phenyl-phosphinic acid (3), 1-methyl-phenyl-phosphinic acid (4), 3-chlor-4-phenyl-1-methyl-phenyl-phosphinic acid, 1-methyl-4-phenyl-phosphinic acid, 1-phosphinic acid, 1-ethyl-phenyl-phosphinic acid (4), 1,3-dimethyl-phenyl-phosphinic acid (4), 1-isopropyl-phenyl-phosphinic acid (4), 1,2,4-trimethyl-phenyl-phosphinic acid (5), naphthyl-phosphinic acid (1), 1-methoxy-phenyl phosphinic acid (4), 1-ethoxy-phenyl-phosphinic acid (4) and the soluble salts thereof such as the ammonium, hydrazino, potassium, sodium, zinc, anilino and the like; aryl sulfinic acids such as phenyl-sulfinic acid, 4-chlor-phenyl-sulfinic acid (1), 4-brom-phenyl-sulfinic acid (1), 4-iodophenyl-sulfinic acid (1), 3-nitro-phenyl-sulfinic acid (1), 4-nitro-phenyl-sulfinic acid (1), 1-methyl-phenyl-sulfinic acid (2), 1-methyl-phenyl-sulfinic acid (3), 1-methyl-phenyl-sulfinic acid (4), 2-nitro-toluyl-sulfinic acid, 2,6-dinitro-toluyl-acid (4), 2-nitro-toluyl-sulfinic acid (3), 1,2-sulfinic acid, 1,2-dimethyl-phenyl-sulfinic acid (4), 1,3-dimethyl-phenyl-dimethyl-phenyl-sulfinic acid (5), 1,4-dimethyl-phenyl-sulfinic acid (2), 1,2,4-trimethyl-phenyl-sulfinic acid (5), 1,3,5-trimethyl-phenyl-sulfinic acid (2), 1-methyl-4-isopropyl-phenyl-sulfinic acid (2), naphthyl-sulfinic acid (1), diphenyl-sulfinic acid (4), anthracene-sulfinic acid (2), 4-methoxy-1-methyl-phenyl-sulfinic acid (3), 5-methoxy-1,3-dimethyl-phenyl-sulfinic acid (2) and their soluble salts such as ammonium, sodium, potassium, barium, hydrazino, zinc, anilino and the like; and boro phosphoric acid and its soluble salts such as ammonium, potassium, sodium, hydrazino or the like.

As previously indicated, the dye brightening agent may be added directly to the sensitizing solution, to a suitable precoat or to a surface sizing operation in the paper mill. Generally, the quantity of the brightening agent used will range from .005 to 1% of the total weight of the precoat, the sensitizing solution or the surface sizing agent. Larger quantities up to 1% are generally employed when the dye brightening agent is added to the precoat or to the surface size.

The diazos and couplers employed are not critical to the invention. Thus, as the diazo, use may be made of the zinc chloride double salt of N,N-diethylamino-p-benzene diazonium chloride, the zinc or cadmium salt of the diazo from N-hydroxy-ethyl-N-methyl-amino-p-amino benzene; from p-amino-diphenylamine; from 1-mono-ethylamino-2-methyl-4-amino benzene; from 1-N-ethyl-N-hydroxyethyl-amino-3-methyl-4-amino benzene. Similarly, use may be made of the diazos described in U.S. Patents 2,523,889, 2,298,444 and the like.

Various couplers such as tetrahydroxy biphenyl, 2,7-dihydroxy-naphthalene-3,6-disulfonic acid, the coupler of U.S. Patent 2,494,906, acetoacetanilide, 2,3-dihydroxy-naphthalene-6-sulfonic acid, resorcinol, 1-hydroxy-naphthimidazole or the like.

The sensitizing composition may also contain the usual adjuncts such as stabililizing agents i.e., thiourea, thiosinamine, naphthalene trisulfonic acid; acids designed to retard precoupling such as citric acid, tartaric acid, boric acid, hygroscopic agents such as glycol, glycerin, dextrin or the like and metal salts for intensifying the image such as magnesium chloride, aluminum sulfate, nickel sulfate or the like.

The invention will be further illustrated by the following examples but it is to be understood that the invention is not restricted thereto.

*Example I*

| | G. |
|---|---|
| Water | 60 |
| Ethylene glycol | 6 |
| Isopropanol | 1 |
| Citric acid | 3 |
| Phenyl-phosphinic acid | 1 |
| Thiourea | 5 |
| Magnesium chloride | 3 |
| Zinc chloride | 3 |
| 2,3-dihydroxynaphthalene-6-sulfonic acid | 4 |
| p-Diazo-N,N-diethylaniline | 2 |
| Saponin | 0.1 |
| Water to | 100 |

This solution was coated on an all sulfite diazotype paper, dried, and exposed under a mercury vapor lamp. Upon development over ammonia, a bright blue line resulted. The same formula without phenyl-phosphinic acid was duller and redder.

The above formula holds its color well in an acid atmosphere; the same formula minus phenyl-phosphinic acid gas fades badly to a brown color.

*Example II*

| | G. |
|---|---|
| Water | 60 |
| Ethylene glycol | 3 |
| Isopropanol | 1 |
| Citric acid | 6 |
| Phenyl-phosphinic acid | 1 |
| Thiourea | 5 |
| Magnesium chloride | 3 |
| Zinc chloride | 3 |
| 2,3-dihydroxynaphthalene-6-sulfonic acid | 1.5 |
| Acetoacetanilide | 0.15 |
| Resorcinol | 0.4 |
| p-Diazo-N,N-diethylaniline | 2 |
| Saponin | 0.1 |
| Water to | 100 |

This solution was coated on an all sulfite diazotype paper, dried, and exposed under a mercury vapor lamp. Upon development over ammonia, a neutral black resulted; the same formula without the aryl-phosphinic acid results in a much redder black line.

The above formula holds its color well in an acid atmosphere; without phenyl-phosphinic acid gas fading to a brown color takes place.

*Example III*

| | G. |
|---|---|
| Water | 60 |
| Ethylene glycol | 3 |
| Isopropanol | 1 |
| Citric acid | 6 |
| Phenyl-phosphinic acid | 1 |
| Thiourea | 5 |
| Magnesium chloride | 3 |
| Zinc chloride | 3 |
| 1-hydroxynaphthimidazole | 2 |
| p-N,N,-ethylbenzylamino benzene diazonium chloride | 1.5 |
| Saponin | 0.1 |
| Water to | 100 |

This solution was coated on an all sulfite diazotype paper, dried, and exposed under a mercury vapor lamp. Upon development over ammonia, a bright red line resulted; the same formula without phenyl-phosphinic acid would show decreased dye brightness.

*Example IV*

| | G. |
|---|---|
| Water | 100 |
| Paper sizing glue | 4 |
| Silica | 5 |
| Phenyl-phosphinic acid | 1 |

The above precoat formulation was coated on an all sulfite diazotype paper and dried. When coated with red, black, or blue sensitizing formulas which do not contain phenyl-phosphinic acid, the favorable results ascribed to this acid are obtained because of its inclusion in the precoat formula.

*Example V*

The procedure was the same as in Example I excepting that the phenyl-phosphinic acid was replaced by an equivalent quantity of phenyl-phosphonic acid.

*Example VI*

The procedure was the same as in Example II excepting that the phenyl-phosphinic acid was replaced by an equivalent quantity of phenyl-sulfinic acid.

*Example VII*

The procedure was the same as in Example IV excepting that the phenyl-phosphinic acid was replaced by an equivalent quantity of boro phosphoric acid.

Modifications of the invention will occur to persons skilled in the art. Thus, any of the print dye brightening agents may be used in lieu of those of the examples. We, therefore, do not intend to be limited in the patent granted except as necessitated by the appended claims.

We claim:

1. Light-sensitive diazotype material comprising a base having a light-sensitive diazo compound coated thereon, said light-sensitive diazo type material containing as a print dye brightening agent an organic acid selected from the class consisting of aryl phosphonic acids, aryl phosphinic acids, aryl sulfinic acids, boro phosphoric acid and the soluble salts thereof.

2. The product as defined in claim 1 wherein the print dye brightening agent is incorporated as a precoat.

3. The product as defined in claim 1 wherein the print dye brightening agent is incorporated in a size on the base.

4. The product as defined in claim 1 wherein the print dye brightening agent is imbibed to the base from the sensitizing solution.

5. The product as defined in claim 1 wherein the print dye brightening agent is phenyl-phosphinic acid.

6. Light-sensitive diazotype materials comprising a base having a light-sensitive diazo compound and a coupling component coated thereon, said light-sensitive diazotype material containing as a print dye brightening agent an organic acid selected from the class consisting of aryl phosphonic acids, aryl phosphinic acids, aryl sulfinic acids, boro phosphoric acid and the soluble salts thereof.

7. The product as defined in claim 6 wherein the print dye brightening agent is incorporated as a precoat.

8. The product as defined in claim 6 wherein the print dye brightening agent is incorporated in a size on the base.

9. The product as defined in claim 6 wherein the print dye brightening agent is imbibed to the base from the sensitizing solution.

10. The product as defined in claim 6 wherein the print dye brightening agent is phenyl-phosphinic acid.

11. In the process of improving the dye brightness in prints obtained from light-sensitive diazotype materials by exposing said materials under a pattern and subjecting the exposed materials to development by means of an alkali in the presence of an azo dye coupling compound, the improvement which consists in effecting the development in the presence of an organic acid selected from the class consisting of aryl phosphonic acids, aryl phosphinic acids, aryl sulfinic acids, boro phosphoric acid and the soluble salts thereof.

References Cited in the file of this patent

UNITED STATES PATENTS

| 2,542,560 | Neumann | Feb. 20, 1951 |
| 2,657,140 | Kessels et al. | Oct. 27, 1953 |

FOREIGN PATENTS

| 548,953 | Great Britain | Oct. 30, 1942 |

OTHER REFERENCES

Freedman et al.: "The Preparation and Properties of Phosphonic Acids," Chemical Reviews, vol. 57, page 500.